United States Patent
Kring, Jr.

(10) Patent No.: US 8,181,433 B2
(45) Date of Patent: May 22, 2012

(54) METHOD OF LAP SEALING A MOLTEN CHEESE PRODUCT WITH NON-WAX FILM

(75) Inventor: James M. Kring, Jr., Elk River, MN (US)

(73) Assignee: Land O'Lakes, Inc., Arden Hills, MN (US)

(*) Notice: Subject to any disclaimer, the term of this patent is extended or adjusted under 35 U.S.C. 154(b) by 360 days.

(21) Appl. No.: 12/108,661

(22) Filed: Apr. 24, 2008

(65) Prior Publication Data

US 2008/0268116 A1 Oct. 30, 2008

Related U.S. Application Data

(60) Provisional application No. 60/926,678, filed on Apr. 27, 2007.

(51) Int. Cl.
B65B 1/04 (2006.01)

(52) U.S. Cl. .......... 53/469; 53/372.2; 53/375.9; 53/449; 53/477

(58) Field of Classification Search .............. 53/449, 53/467, 469, 477, 371.2, 371.9, 372.2, 372.5, 53/372.7, 375.8, 375.9
See application file for complete search history.

(56) References Cited

U.S. PATENT DOCUMENTS

| | | | | |
|---|---|---|---|---|
| 2,196,666 A * | 4/1940 | Moore | ......... | 53/372.2 |
| 2,214,997 A * | 9/1940 | Guyer | ......... | 53/449 |
| 2,255,975 A * | 9/1941 | Hultkrans | ......... | 53/449 |
| 2,274,344 A * | 2/1942 | Palmer | ......... | 53/449 |
| 2,319,956 A * | 5/1943 | Snyder | ......... | 53/449 |
| 2,323,467 A * | 7/1943 | Guyer | ......... | 53/449 |
| 2,328,766 A * | 9/1943 | Yates | ......... | 53/449 |
| 2,677,924 A * | 5/1954 | Coakley | ......... | 53/372.5 |
| 2,784,542 A * | 3/1957 | Stark | ......... | 53/239 |
| 3,269,635 A * | 8/1966 | Bergstein et al. | ......... | 53/449 |
| 3,459,357 A * | 8/1969 | Egger et al. | ......... | 53/449 |
| 4,413,464 A * | 11/1983 | Larsson et al. | ......... | 53/449 |
| 4,495,209 A * | 1/1985 | Whiteside | ......... | 426/392 |
| 4,574,564 A * | 3/1986 | Pester | ......... | 53/441 |
| 5,402,906 A * | 4/1995 | Brown et al. | ......... | 426/106 |
| 6,063,417 A * | 5/2000 | Paleari et al. | ......... | 426/127 |
| 6,667,082 B2 * | 12/2003 | Bamore et al. | ......... | 428/34.8 |
| 2002/0034622 A1 * | 3/2002 | Edwards et al. | ......... | 428/220 |

* cited by examiner

*Primary Examiner* — Christopher Harmon
(74) *Attorney, Agent, or Firm* — Dorsey & Whitney LLP; Bridget M. Hayden

(57) ABSTRACT

A method of sealing a non-wax-coated film pouch contained within an enclosure includes forming an enclosure, positioning a piece of non-wax-coated film within the enclosure to form a floor and side walls of a pouch within the enclosure, dispensing a flowable dairy-based product into the pouch, overlapping portions of the film onto one another to produce a top wall over the dairy-based product, and heat sealing the overlapping portions of the top wall to each other.

12 Claims, 10 Drawing Sheets

METHOD OF LAP SEALING A MOLTEN CHEESE PRODUCT WITH NON-WAX FILM

CROSS-REFERENCE TO RELATED APPLICATIONS

This application claims priority from U.S. Provisional Patent Application Ser. No. 60/926,678, filed Apr. 27, 2007, entitled "Method of lap sealing cheese with non-wax film," hereby incorporated by reference in its entirety.

BACKGROUND OF THE INVENTION

Many processed cheese and cream cheese manufacturers utilize pouch forming, filling, and sealing equipment from American Can Company or Hart Manufacturing. Conventional processes utilize wax coated film (usually cellophane based) to make various size pouches on horizontal pouch forming equipment. Once these pouches are formed, they are filled with a food product such as cheese and sealed utilizing a "lap seal." A lap seal is made by over-lapping films. The wax sealant layer of the waxed film provides a way to form a lap seal on the package due to the low melt initiation temperatures of wax coupled with its excellent flow and caulking properties. The heat of the molten cheese product (typically about 165° F.) is generally sufficient to activate a wax lap seal. However, waxed films are expensive and have a tendency to delaminate, wherein the wax layer pulls away from the film substrate and sticks to the food surface upon opening.

Currently, most pouch forming equipment, when using non-wax film such as a polymeric film, requires the formation of a "fin seal." A fin seal has edges of superimposed films bonded to each other, resulting in a pouch having a fin-like protuberance. A fin seal requires a wider film width to make the fin, thus requiring more material per pouch and also tending to require considerably slower line speeds to properly facilitate the sealing of the fin seal. Moreover, a high cost is associated with retrofitting equipment to provide for formation of a fin seal.

SUMMARY OF THE INVENTION

A method of sealing a non-wax-coated film pouch contained within an enclosure includes forming an enclosure, positioning a piece of non-wax-coated film within the enclosure to form a floor and side walls of a pouch within the enclosure, dispensing a flowable dairy-based product into the pouch, overlapping portions of the film onto one another to produce a top wall over the dairy-based product, and heat sealing the overlapping portions of the top wall to each other.

DETAILED DESCRIPTION OF ILLUSTRATIVE EMBODIMENTS

Figure 1:
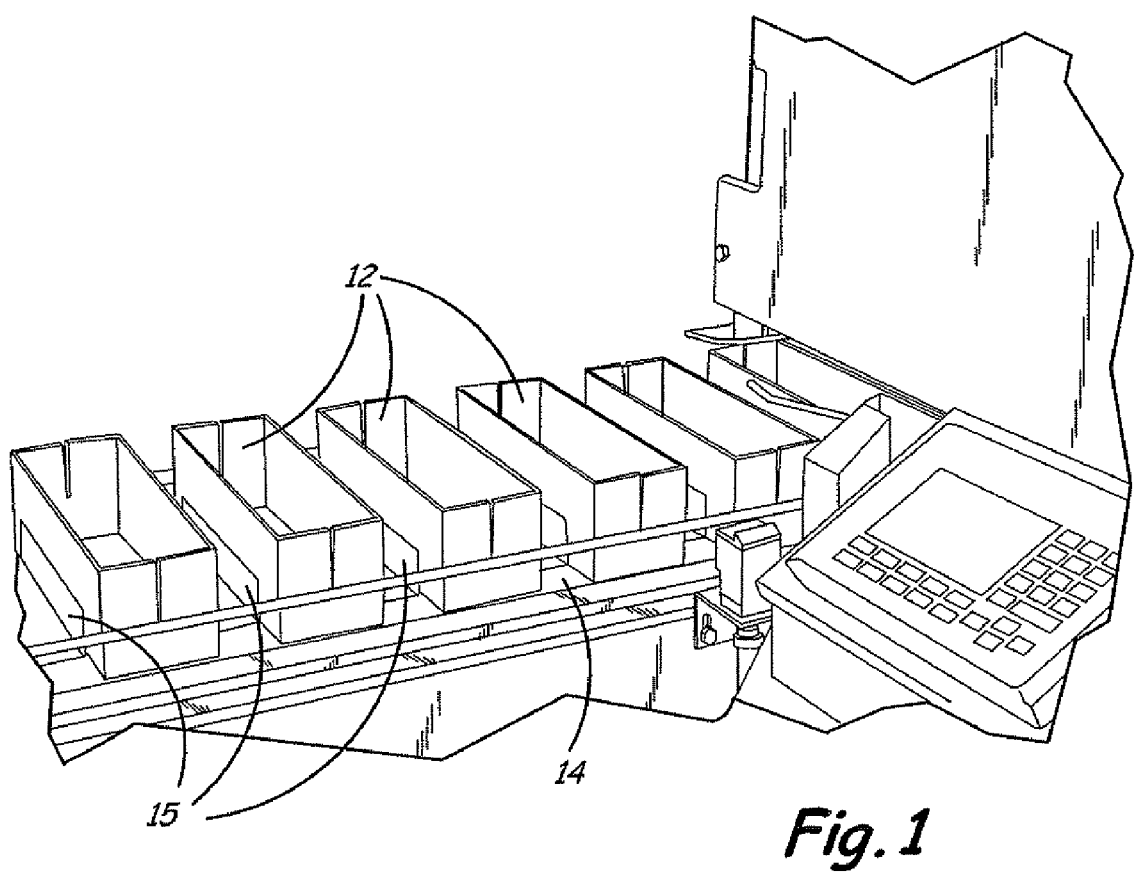
FIG. 1 is a perspective view of a plurality of cartons on a conveyer.

The ability to use a non-wax film without a fin seal results in considerable materials savings due to less film being required per package. Further, no costly retrofitting of equipment is needed for fin sealing capabilities. Moreover, increased production results from faster line speeds. In one example, this disclosure discusses the use of a non-wax-coated film in 5 lb. and 2 lb. processed cheese packaging operations. A finished block of wrapped cheese is sometimes referred to as a "loaf."

This disclosure relates to the utilization of a lap sealable polymer packaging film with no wax component. In an exemplary embodiment, the film is used on horizontal pouch forming, filling and sealing equipment that packages processed cheeses and other variable viscosity foods and ingredients. Particularly suitable equipment is available from American Can Company and Hart Manufacturing.

An exemplary film is a 3 mil thick, 3-layer film available from Alcan Packaging. The first layer is composed of oriented polypropylene (OPP). A thin layer of polyurethane adhesive laminates the OPP layer to a sealant layer having glycerol monostearate (GMS) blended into an ethylene vinyl acetate—polybutylene (EVA-PB) and polyethylene sealant for enhanced cheese release properties. This film exhibits even better release properties if it has been allowed to cure for several weeks after manufacture and before use. In exemplary embodiments, the film did not exhibit tacking issues in the pouch gusset area. This sealant resin blend possesses a relatively low heat activation temperature (successfully sealing at about 220° F.). This film possesses adequate stiffness, a pouch formed therefrom flares properly in a carton, the pouch stays in the carton as an insertion ram exits, and the pouch travels to the filling area satisfactorily. An exemplary embodiment has a 14.875" printed eyespot fiducial repeat pattern.

In an exemplary embodiment, a pouch former forms a pouch from film roll stock material. In one embodiment, the roll stock has a maximum diameter of 24 inches with a core diameter of 6 inches. Film is unwound from master rolls by means of a nip roll. The speed of the unwind is controlled by a programmable variable speed DC drive. An additional nip roll is located near the film cutoff. Constant tension between the nip rolls is maintained throughout the pouch former. Optional items in the unwind area include a splice plate for easy splicing of new roll material (a vacuum holds the web in place while splicing) and an auto tracker to maintain the edge position of the film. A powered unwind unit pulls the film web from the rolls. In an exemplary embodiment, an edge of the film is turned over to provide an "easy opening" feature. The turned over edge also adds rigidity to the pouch, which enables the pouch to be more erect in the carton. In an exemplary embodiment, each stock film roll core shaft has a roll side adjustment that is used to move the film roll to achieve top edge evenness.

A servo pneumatic web aligner guides the film through a set of stationary and dancer rollers into the forming board. The film runs through a former to make a c-fold and then a bottom gusset is opened to form a pouch of the desired size. In an exemplary embodiment, a pouch has a length of about 14 to 15 inches.

Pneumatically operated side seal bars section off the film web into individual pouches. Servo driven nip rolls pull the pouches into the opener/inserter section. As a pouch is fed out over the opener/inserter, it is held by a set of vacuum jaws. The pouch is then cut by a pneumatic shear knife and opened by servo driven vacuum boxes.

The folded film moves into a pneumatic heat sealing station, where end seals are placed onto the pouch. In an exemplary embodiment, the sealing assembly is activated through the use of servo driven seal jaws that offer variability in jaw dwell time. In an exemplary embodiment, compression washers are used on both sides of the sealing jaws to equalize sealing pressure on both sides of the jaw face. There are regions of greater pressure at the bottoms of the jaw faces. In an exemplary embodiment, the seal jaw back plate is made of silicone rubber.

Some embodiments use current "pancake style" metal sealing jaws. The heating bars are held by a pancake assembly that allows seal adjustment up and down as well as adjustments in pouch length. Shimming the sealing jaws on the "machine" side improves the sealing pressures obtained on the end seals. In an exemplary embodiment, the jaws were shimmed a total of 0.035 inch. The jaws thus shimmed had more consistent and even sealing pressure and allowed for the use of lower sealing temperatures. In other embodiments, older "scissors" type sealing jaws are used. The spring loaded pressures exhibited by the scissors jaws help provide for uniform sealing pressure on the end seals.

In an exemplary embodiment, the sealing jaw assembly has 4 heating zones that can be individually controlled for temperature and pressure: the top and bottom of each of the pair of jaws comprise individual zones. In an exemplary method, the top zones are heated to a higher temperature than the bottom zones. This is because higher temperatures are generally desirable to produce adequate end seals. However, lower temperatures are desirable in the bottom zones because that is where a gusset of the pouch is formed; if temperatures in the bottom zone are too high, the film sticks to itself in a phenomenon called "gusset tacking," thereby preventing the pouch from opening.

After the end seals are applied, the film web moves to a "V" notcher, where a "V"-shaped notch is cut into the film web between pouches to facilitate forming and folding pouches downstream in production. A 1.5 inch V-notch is particularly suitable for providing a combination of folding and machineability.

The film is then moved through a series of feed rollers, where the pouch is automatically cut from the web. The pouch is cut off by a guillotine knife at its proper length and held in place by servo controlled vacuum plates to await insertion into corrugated trays by a pneumatic plunger.

FIG. 1 is a perspective view of a plurality of cartons 12 on a conveyer 14. Enclosures such as corrugated cardboard trays, boxes or cartons, formed in another area of the plant, are conveyed to the pouch inserter area. In an exemplary embodiment, cartons 12 are pushed onto conveyor 14 by line pressure. A backlog sensor stops cartons 12 from feeding in case of a backlog. Brackets 15 keep cartons 12 properly spaced and oriented.

Figure 2:
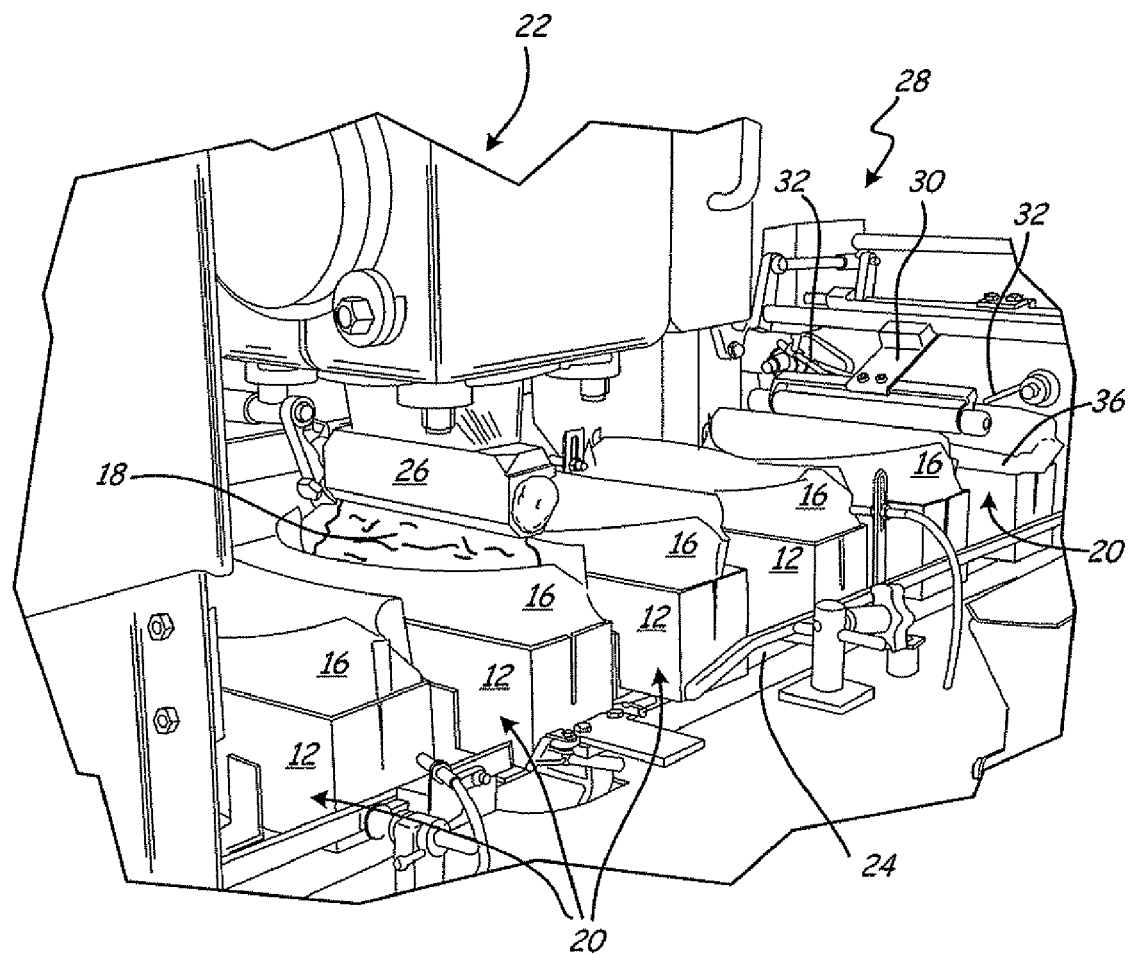
FIG. 2 is a perspective view of the cartons of FIG. 1 having pouches inserted therein, the pouches being filled with molten cheese product.

FIG. 2 is a perspective view of the cartons 12 of FIG. 1 having pouches 16 inserted therein. If cartons 12 are detected, the pouches 16, formed as discussed above, are advanced to the inserter area. In the inserter area, a plunger ram block inserts an opened pouch 16 into each carton 12. Each pouch 16 includes a floor and side walls formed from the stock non-wax-coated film. To make sure the pouch 16 is inserted properly, the plunger ram block flares out with use of air cylinders as it is inserted. In other words, a pulsed air blower may be provided on the plunger to reduce the tendency of pouches 16 to be pulled back out of the carton 12 when the plunger is retracted. The plunger ram retracts and releases the pouch 16 in the carton 12. The pouched carton 20 then passes through a reject station. In this station, if a pouch 16 is not detected, the empty carton 12 is blown off by means of an air blast.

The pouch 16 has a rectangular bottom that closely fits the inside dimensions of the formed carton 12. The pouch 16 preferably has no creases or film wrinkles to mar the display appearance. The inserted pouches 16 preferably remain erect in all four floor corners of the carton 12.

In some embodiments, the pouched carton 20 is then indexed to the pouch flaring station to open the top of the pouch 16. The flarer unit is a vertically reciprocating unit with flare fingers or rods that extend downward toward the interior of pouch 16. After flaring, the flared, pouched carton 20 is indexed to the filling station 22. Defective pouches 16 or cartons 12 are detected and rejected prior to the filling station 22.

In an exemplary embodiment, the filling conveyor 24 is a single lane lugged chain conveyor that indexes the pouched cartons 20 through the various stages of the filling station 22. A servo motor and camco gear drive the filling conveyor 24. A main AC motor drives the forming ram and filler head 26.

A servo motor lowers the filler head 26 into the pouched carton 20 for filling with a flowable, dairy-based product 18 such as molten, processed cheese. If the viscosity of the molten cheese product 18 changes, the speed of the lowering action can be changed. In an exemplary embodiment, the filler head 26 is a mechanically powered single piston that measures product 18 by volume. The filler head 26 has four basic functions in its operation. First, there is the fill piston reciprocation, which is accomplished by a shaft-mounted cam. The linkage contains a screw adjustment, which can increase or decrease the amount of fill piston travel, thus changing the volume of product 18 as required.

The adjustment is done by a push button from the console. The button activates a stepper motor and turns the adjustment screw. Optionally, it can be tied to a checkweigher and adjusted automatically from the weighed packages. The second function is a rotary spool valve located in the hopper base. It permits product flow from the hopper into the piston-cylinder on the suction stroke, then upon actuation allows the product to be pumped down through the nozzle. A photoeye sensor mounted ahead of the filling station 22 senses a pouched carton 20. It engages a no-fill lockout feature if the sensor fails to sense a pouched carton 20. The third function utilizes a double acting air cylinder to activate the rotary valve on the nozzle. Once the valve opens, the cheese product 18 is filled into the pouched carton 20. The rotary valve is used with processed cheese. For cream cheese applications, a tapered nozzle may be used. A fourth function is an optional product agitator inside the hopper. The standard hopper is single-walled and comes with a one-piece cover. Alternatively, a two-wall hopper can be used, in which warm water can be run between the walls to prevent the cheese product 18 from cooling or setting. A two-piece hopper cover can be added for simplicity in setting the level of cheese product 18 in the hopper, especially during startup.

Figure 3A:
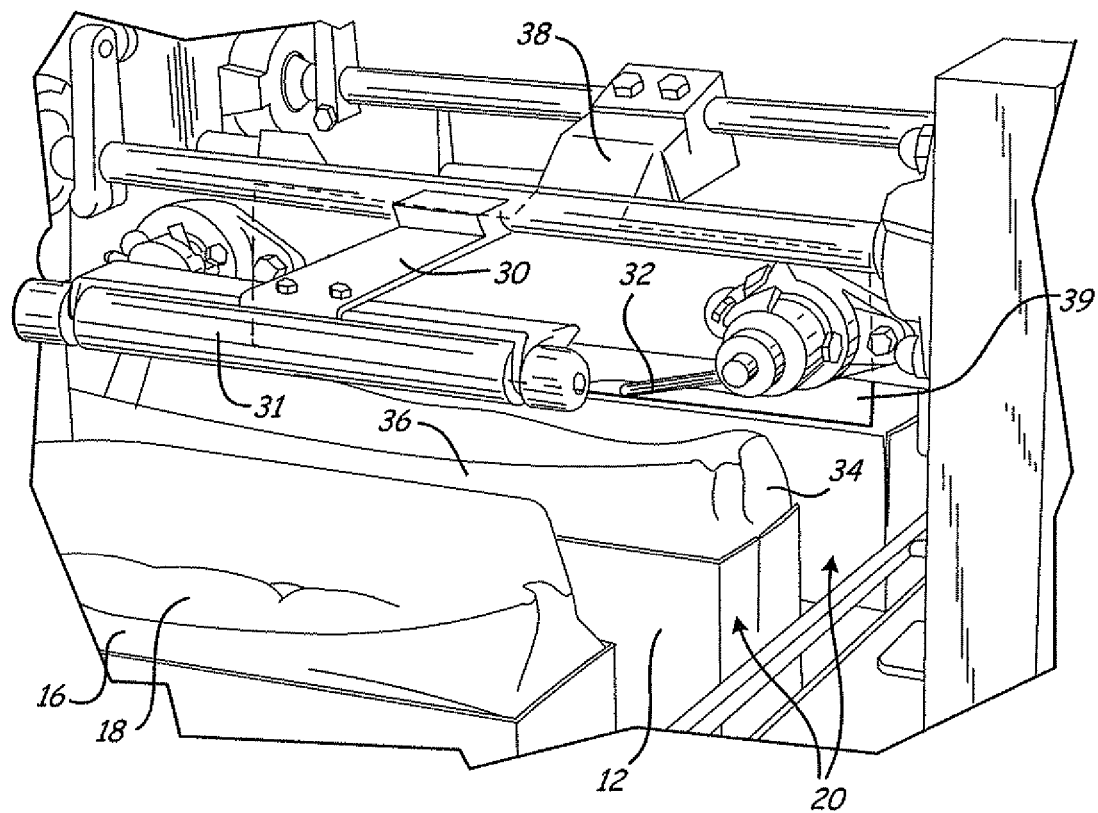
FIG. 3A is a perspective view of an assembly of a first sweeper arm and a pair of rocker arms disposed over a carton having a pouch therein filled with molten cheese product.
Figure 3B:
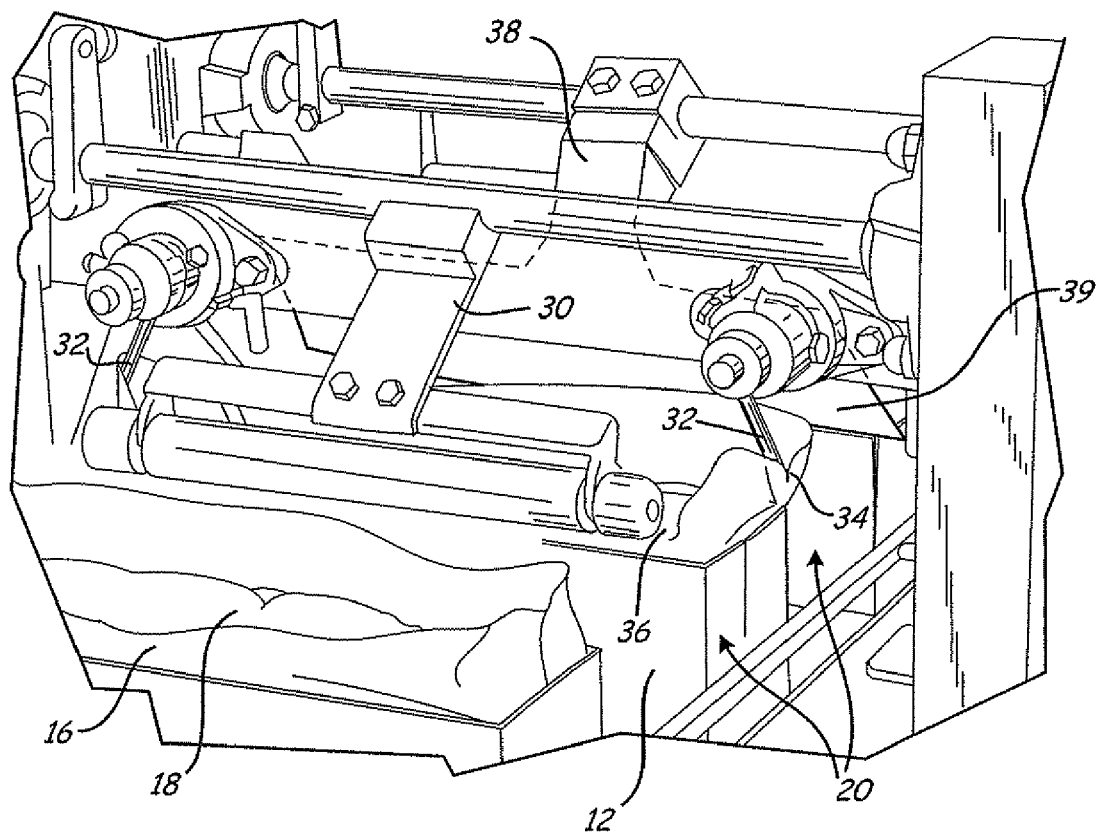
FIG. 3B is a perspective view of a first sweeper arm folding down one side of a top portion of a pouch and a pair of rocker arms pulling out the ears of the pouch.

Once filled, the pouched carton 20 moves forward to the pouch folding station 28. FIG. 3A is a perspective view of an assembly of a first sweeper arm 30 with roller 31 and a pair of rocker arms 32 disposed over a pouched carton 20 filled with molten cheese product 18. FIG. 3B is a perspective view of first sweeper arm 30 folding down one side 36 of a top portion of a pouch 16 with roller 31. Simultaneously, a pair of rocker arms 32 pulls out the ears 34 of the pouch 20. As roller 31 of first sweeper arm 30 folds down a first side 36 of the top portion of the pouch 16 over the top of the cheese product 18, the first side 36 of the pouch film sticks to the cheese product 18.

Second sweeper arm 38 is positioned behind the assembly of rocker arms 32. In an exemplary embodiment, plate 39 is attached at an end of second sweeper arm 38 to flatten the cheese product 18 and smooth the first side 36 of the pouch film on the pouched carton 20 in the next index position. In an exemplary embodiment, each of first sweeper arm 30, second sweeper arm 38, and the pair of rocker arms 32 pivots between the positions shown in FIGS. 3A and 3B.

In an exemplary embodiment, the pivotal motion of first sweeper arm 30 and second sweeper arm 38 is coordinated so that they move together. Thus, both first sweeper arm 30 and second sweeper arm 38 are in an "up" position in FIG. 3A and both first sweeper arm 30 and second sweeper arm 38 are in a "down" position in FIG. 33. In an exemplary embodiment, first sweeper arm 30 and second sweeper arm 38 simultaneously act upon two adjacent pouched cartons 20.

With first sweeper arm 30, second sweeper arm 38 and pair of rocker arms 32 in the position shown in FIG. 3A, pouched cartons 20 are indexed through pouch folding station 28. The film of each pouched carton 20 is folded as first sweeper arm 30 and pair of rocker arms 32 pivot to the positions shown in FIG. 3B. First sweeper arm 30 and pair of rocker arms 32 alternate between the positions shown in FIGS. 3A and 3B as the plurality of pouched cartons 20 index through pouch folding station 28. In the next index position, the pouched carton 20 then is contacted by plate 39 of second sweeper arm 38 to flatten and smooth the first side 36 of the pouch film.

Figure 3C:
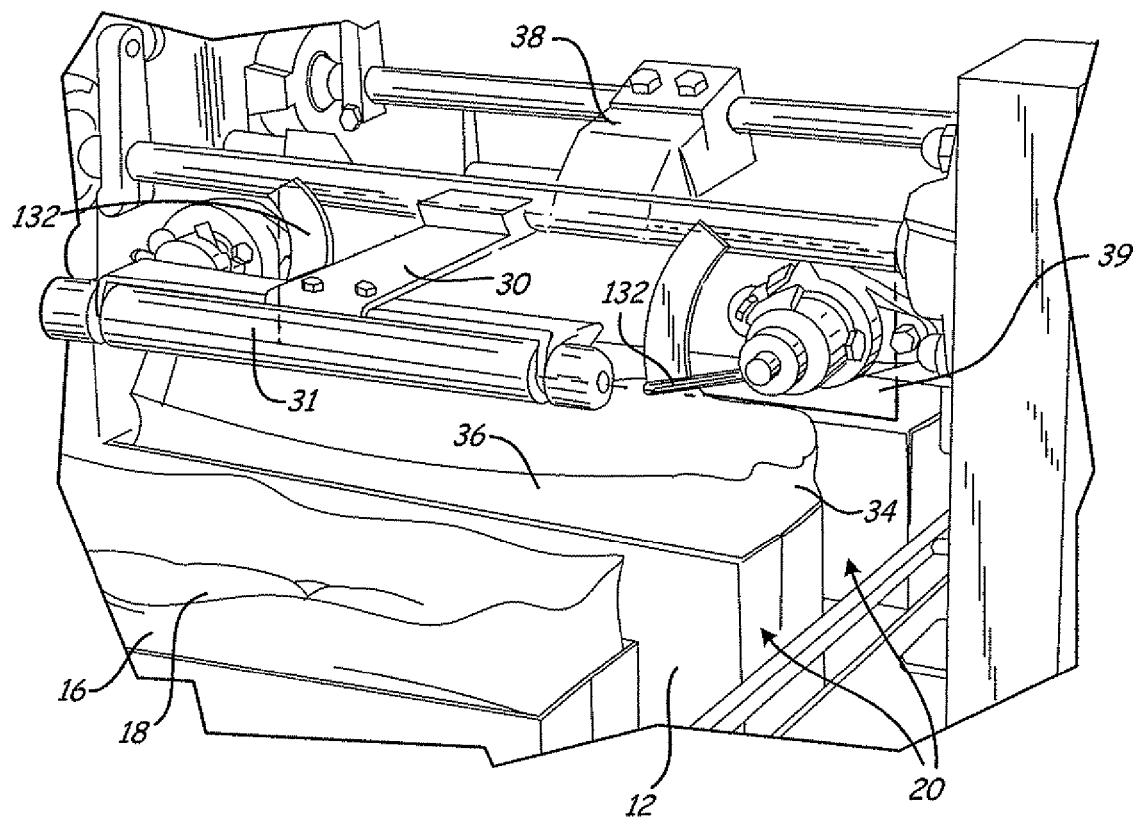
FIG. 3C is similar to FIG. 3A but shows another embodiment of a rocker arm.
Figure 3D:
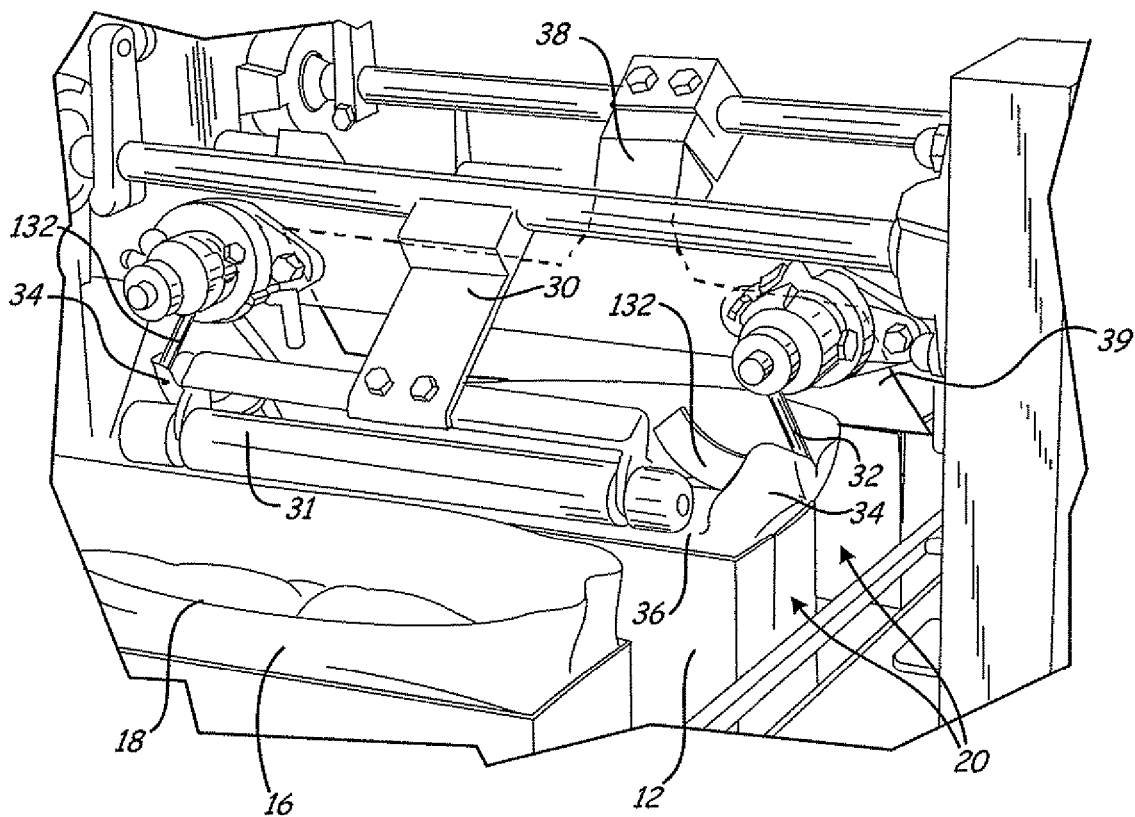
FIG. 3D is similar to FIG. 3B but shows another embodiment of a rocker arm.

FIG. 3C is similar to FIG. 3A but shows a sickle shaped embodiment of a rocker arm 132. FIG. 3D is similar to FIG. 3B but shows a sickle shaped embodiment of a rocker arm 132. The shape of sickle rocker arms 132 assists in flaring out ears 34 of pouch 16, thereby leading to more uniform shaping of ears 34.

Figure 4:
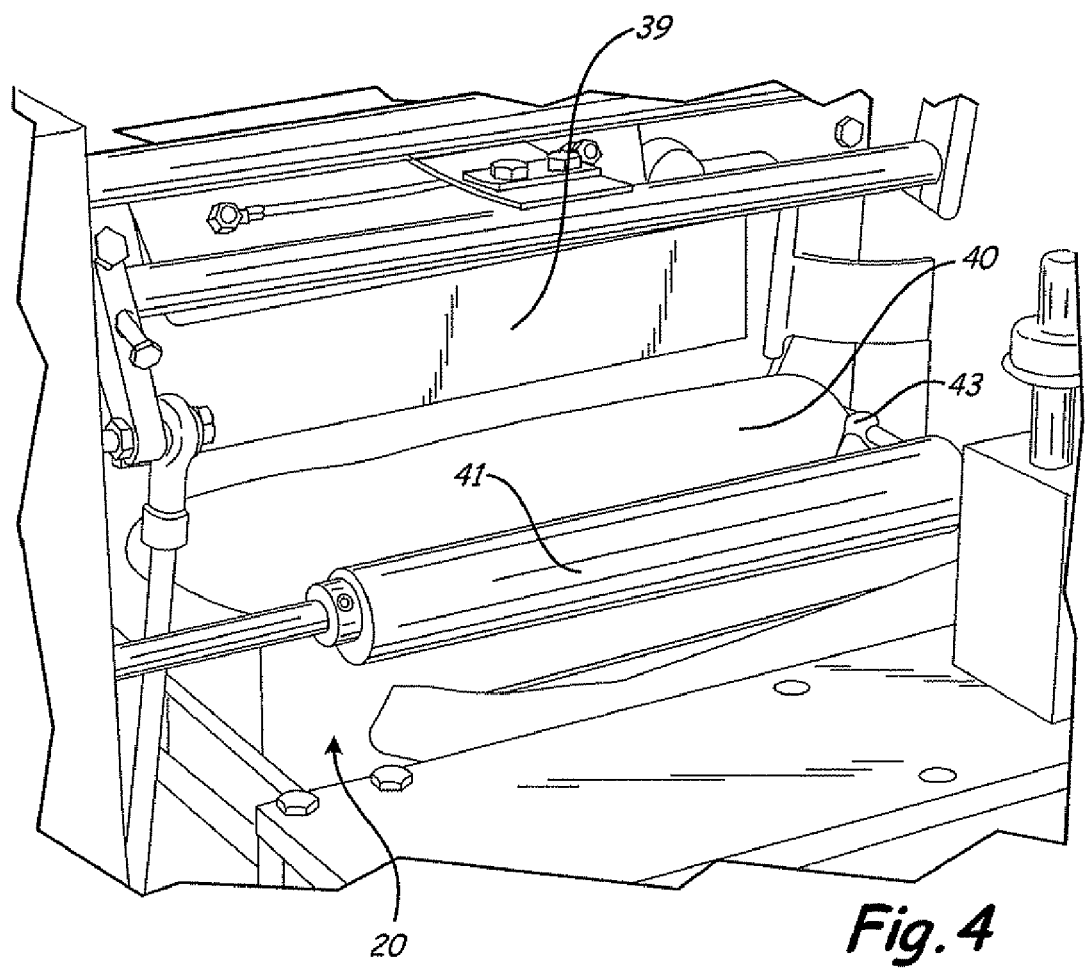
FIG. 4 is a perspective view of a guide folding down the other side of a top portion of a pouch.

FIG. 4 is a perspective view of a guide 41 folding down the second side 40 of a top portion of a pouch 16. In an exemplary embodiment, guide 41 is connected to pouch folding station 28 at pivotal connection 43, which allows some vertical movement of a bottom surface of guide 41 to accommodate irregularities in the filling of cheese product 18. While guide 41 is depicted as a roller, it can also be a plate or other member, preferably one that allows for vertical motion of its bottom surface. After this step, a portion of the second side 40 overlaps the first side 36 of the top portion of the pouch 16, thereby forming a top wall over cheese product 18. A guide plate may be used to keep the top wall flat before the tamp sealing station 42.

Figure 5:
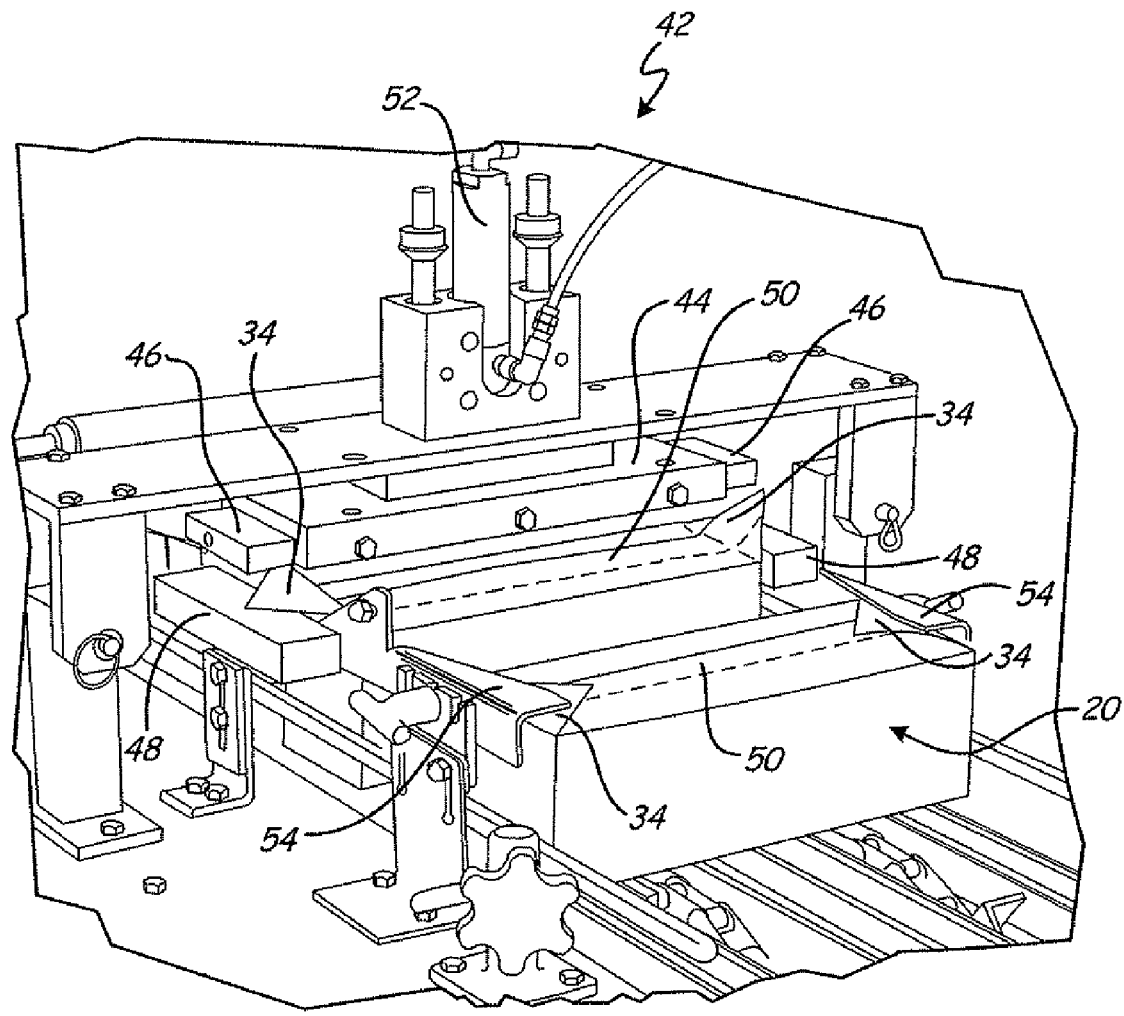
FIG. 5 is a perspective view of a tamper in a raised position above a pouch.

The folded pouch is then sent to a heat tamp sealing station 42. FIG. 5 is a perspective view of a tamper 44 in a raised position above a pouch 16. In an exemplary embodiment, tamper 44 is a heated platen. In an exemplary embodiment, tamper 44 includes extensions for heated upper ear anvils 46. Ears 34 of pouch 16 extend between upper ear anvil 46 and lower ear anvil 48. In an exemplary embodiment, both upper ear anvil 46 and lower ear anvil 48 are heated, so that each ear 34 is sealed with heat from both the top and bottom sides of the ear 34. Because pressure is provided on both sides of the ear 34, a lower sealing temperature may be used compared with the temperature of tamper 44. The temperature of heated ear anvils 46, 48 is generally in the range of about 125-130° F. in one embodiment. In an exemplary embodiment, ear guides 54 fold down ears 34 as pouched cartons 20 are indexed past ear guides 54.

Figure 6:
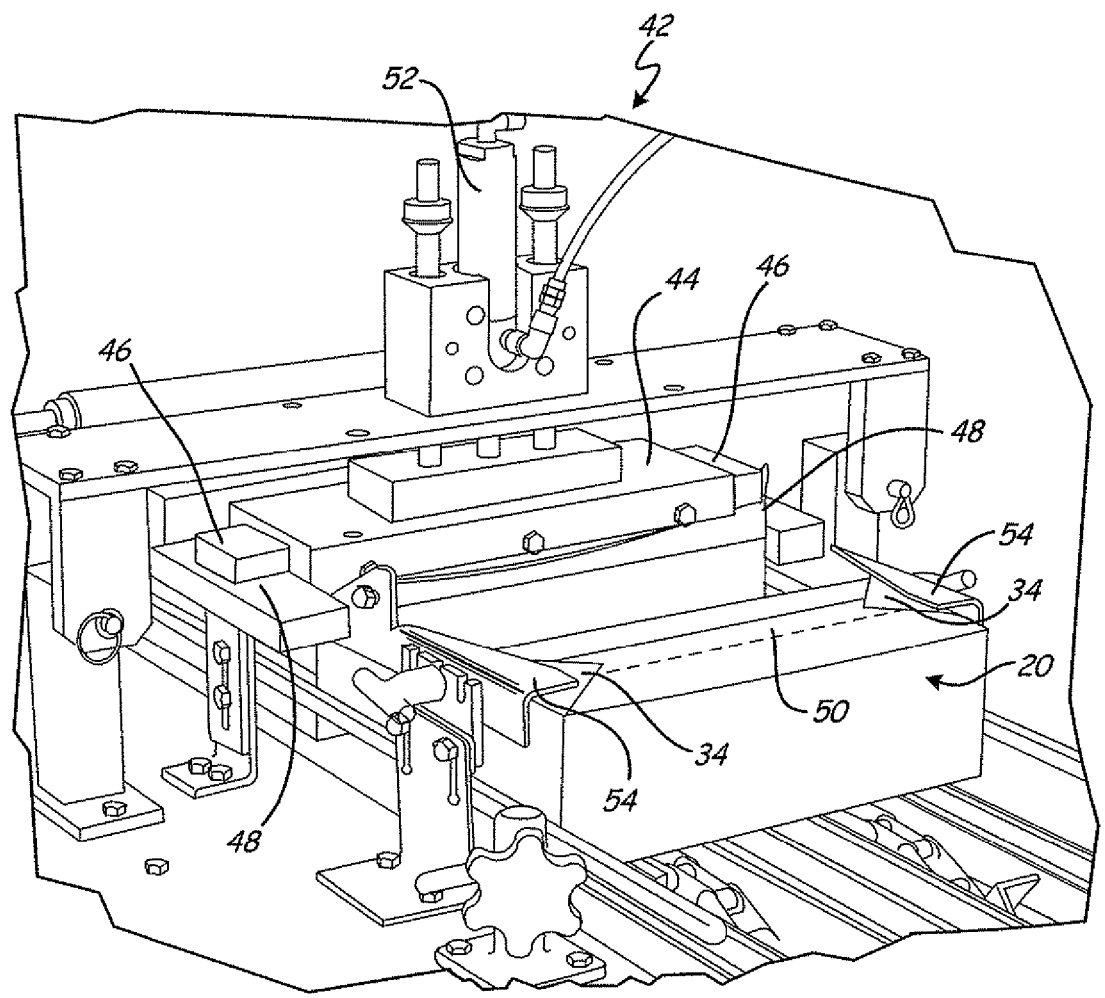
FIG. 6 is a perspective view of a tamper in a lowered, sealing position on a pouch.

FIG. 6 is a perspective view of a tamper 44 in a lowered, sealing position on pouch 16. Lap seal 50 is produced by the overlap of second side 40 over first side 36 of the top portions of pouch 16 over product 18. A function of tamper 44 is to push down on the lap seal 50, expel trapped air from the headspace of the pouch 16, and apply heat to activate the lap seal 50. The tamper 44 is actuated by means of an air cylinder 52. Generally, higher sealing temperatures result in better sealing. However, higher temperatures can also cause distortion of lap seal 50 such as wrinkling and creasing. In some embodiments, a sealing temperature of about 220-265° F. is used. A temperature of about 275° F. may used without adverse effect if limited to a short dwell time. Tamper 44 is in the raised position shown in FIG. 5 as pouched cartons 20 are indexed through heat tamping station 42. When an unsealed pouched carton 20 is positioned under tamper 44, tamper 44 is actuated to press down on lap seal 50 and ears 34, as shown in FIG. 6. Tamper 44 is then raised to allow for indexing of the next pouched carton 20.

Figure 7:
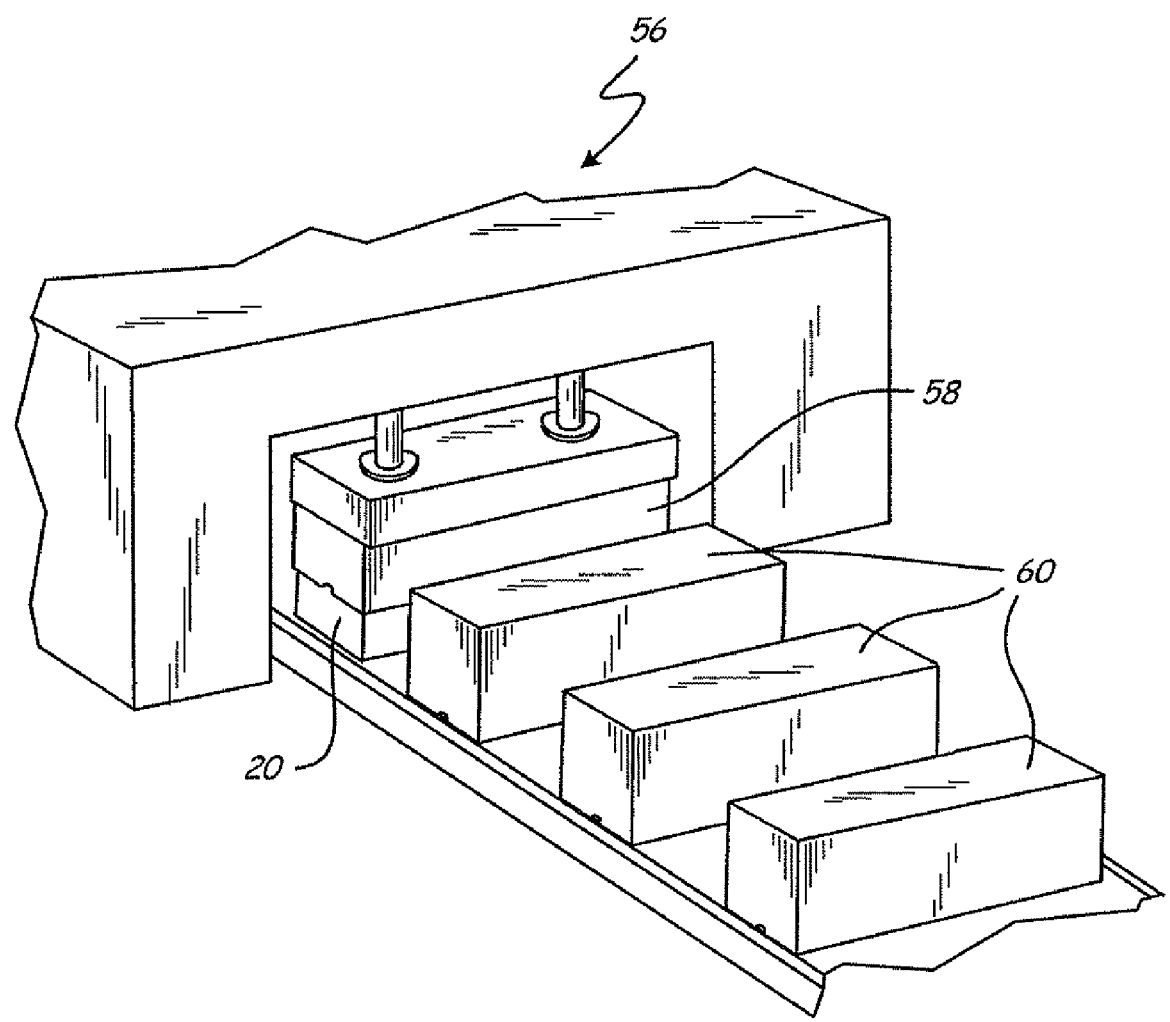
FIG. 7 is a perspective view of a lidding operation for sealed pouches within cartons.

The pouched cartons 20 are then discharged to a lidding operation, in which a lid is positioned over the top of the pouched carton 20. FIG. 7 is a perspective view of a lidding station 56 for applying lids 58 to sealed, pouched cartons 20 to form packages 60. In the illustrated embodiment, the lids 58 are pre-formed. In another embodiment, the lids are provided as flat blanks that are then folded and glued to the pouched carton 20 on-line. In an exemplary method, a flat lid blank is positioned over a pouched carton 20 as the carton 20 is raised to meet the lid. As the pouched carton 20 continues to move upward, the sides of the lid are bent down over the pouched carton 20. The lid is glued to the pouched carton 20 with hot-melt adhesive.

In an exemplary embodiment, six packages 60 are side-loaded into a corrugated case. Each package 60, comprising a lidded, pouched, and sealed enclosure 20, is flipped so that the top wall 36, 40 is below the dairy based product 18. In an example, the finished case is date coded and flipped over so that residual heat and product pressure further assist in forming the bond of lap seal 50. Finally, the flipped cases are conveyed to a variable retention time (VRT) area, where they are cooled based on particular product requirements.

Although the disclosure refers to exemplary embodiments, workers skilled in the art will recognize that changes may be made in form and detail without departing from the spirit and scope of the invention.

What is claimed is:

1. A method of sealing a non-wax-coated film pouch contained within an enclosure, the method comprising:
   forming an enclosure;
   positioning a non-wax-coated film within the enclosure, the film comprising a polymeric layer bonded to a sealant resin layer;
   dispensing a flowable dairy-based product into the pouch and in contact with the sealant resin layer;
   overlapping first and second portions of the film in which the first portion of the film comprising a first portion of the polymeric layer bonded to a first portion of the sealant resin layer is folded over such that the sealant resin layer of the first portion contacts the dairy-based product, and the second portion of film comprising a second portion of the polymeric layer bonded to a second portion of the sealant resin layer is folded over such that the sealant resin layer of the second portion contacts the polymeric layer of the first portion; and heat sealing the folded over overlapping first and second portions to each other, whereby the first portion of the polymeric layer is bonded to the second portion of the polymeric layer by the second portion of the sealant resin layer;

wherein the heat sealed first and second portions are free of a fin seal.

2. The method of claim 1 wherein the step of overlapping portions of the film comprises using a first pivoting arm to fold a first side of a top portion of the pouch over the flowable dairy-based product.

3. The method of claim 2 wherein the step of overlapping portions of the film comprises using a guide to fold a second side of a top portion of the pouch over the flowable dairy-based product.

4. The method of claim 2 wherein the step of overlapping portions of the film comprises using a second pivoting arm to flatten the first side of the top portion of the pouch over the flowable dairy-based product.

5. The method of claim 1 wherein the step of overlapping portions of the film comprises:

using a first pivoting arm to fold a first side of a top portion of the pouch over the flowable dairy-based product; and using a pair of rocker arms to pull out a pair of ears on the pouch.

6. The method of claim 5 wherein the step of using the first pivoting arm and the step of using the pair of rocker arms are performed simultaneously.

7. The method of claim 1 wherein the step of overlapping portions of the film comprises forming ears on the pouch that extend outside the enclosure.

8. The method of claim 7 further comprising heat sealing each ear of the pouch.

9. The method of claim 8 wherein the step of heating sealing the overlapping portions of the first and second portions is performed at a first temperature and wherein the step of heat sealing each ear is performed at a second temperature, the first temperature being greater than the second temperature.

10. The method of claim 7 further comprising using a guide to fold down each ear.

11. The method of claim 1 wherein the step of heat sealing comprises bringing a heated tamper in contact with the top wall.

12. The method of claim 1 further comprising flipping the enclosure so that the first and second portions are below the dairy-based product.

* * * * *

UNITED STATES PATENT AND TRADEMARK OFFICE
CERTIFICATE OF CORRECTION

| | |
|---|---|
| PATENT NO. | : 8,181,433 B2 |
| APPLICATION NO. | : 12/108661 |
| DATED | : May 22, 2012 |
| INVENTOR(S) | : Kring, Jr. |

It is certified that error appears in the above-identified patent and that said Letters Patent is hereby corrected as shown below:

| Column | Line | | Should Read |
|---|---|---|---|
| 5 | 26 | ""down" position in FIG. 33" | -- "down" position in FIG. 3B -- |

CLAIMS

| Column | Line | | Should Read |
|---|---|---|---|
| 6 | 57 | "non-wax-coated film within" | -- non-wax-coated film pouch within -- |

Signed and Sealed this
Tenth Day of July, 2012

David J. Kappos
*Director of the United States Patent and Trademark Office*